[19] United States Patent
Stephens

[11] Patent Number: 4,586,692
[45] Date of Patent: May 6, 1986

[54] FLUSHOMETER VALVE INTEGRABLE WITH A STRUCTURE

[75] Inventor: James B. Stephens, La Crescenta, Calif.

[73] Assignee: Coast Foundry & Manufacturing Company, Pomona, Calif.

[21] Appl. No.: 672,282

[22] Filed: Nov. 16, 1984

[51] Int. Cl.[4] .......................................... F16K 21/06
[52] U.S. Cl. ..................................... 251/15; 4/407; 4/408; 137/217; 137/218; 251/39; 251/40
[58] Field of Search .................... 251/15, 23, 36, 38, 251/39, 40, 46, 47, 51; 4/407, 408, 423; 137/217, 218

[56] References Cited

U.S. PATENT DOCUMENTS

| 1,114,398 | 10/1914 | Sloan | 251/40 |
| 1,839,962 | 1/1932 | Groeniger et al. | 137/217 |
| 2,872,150 | 2/1959 | Phillipe | 251/40 |
| 3,610,280 | 10/1971 | Kitamura | 251/39 |
| 3,714,954 | 2/1973 | Fichter | 251/15 |
| 4,227,674 | 10/1980 | Grant, Jr. | 251/15 |
| 4,272,052 | 6/1981 | Gidner | 251/40 |

Primary Examiner—G. L. Walton
Attorney, Agent, or Firm—Donald D. Mon

[57] ABSTRACT

A flushometer valve integrable with a structure to which it is mounted.

12 Claims, 8 Drawing Figures

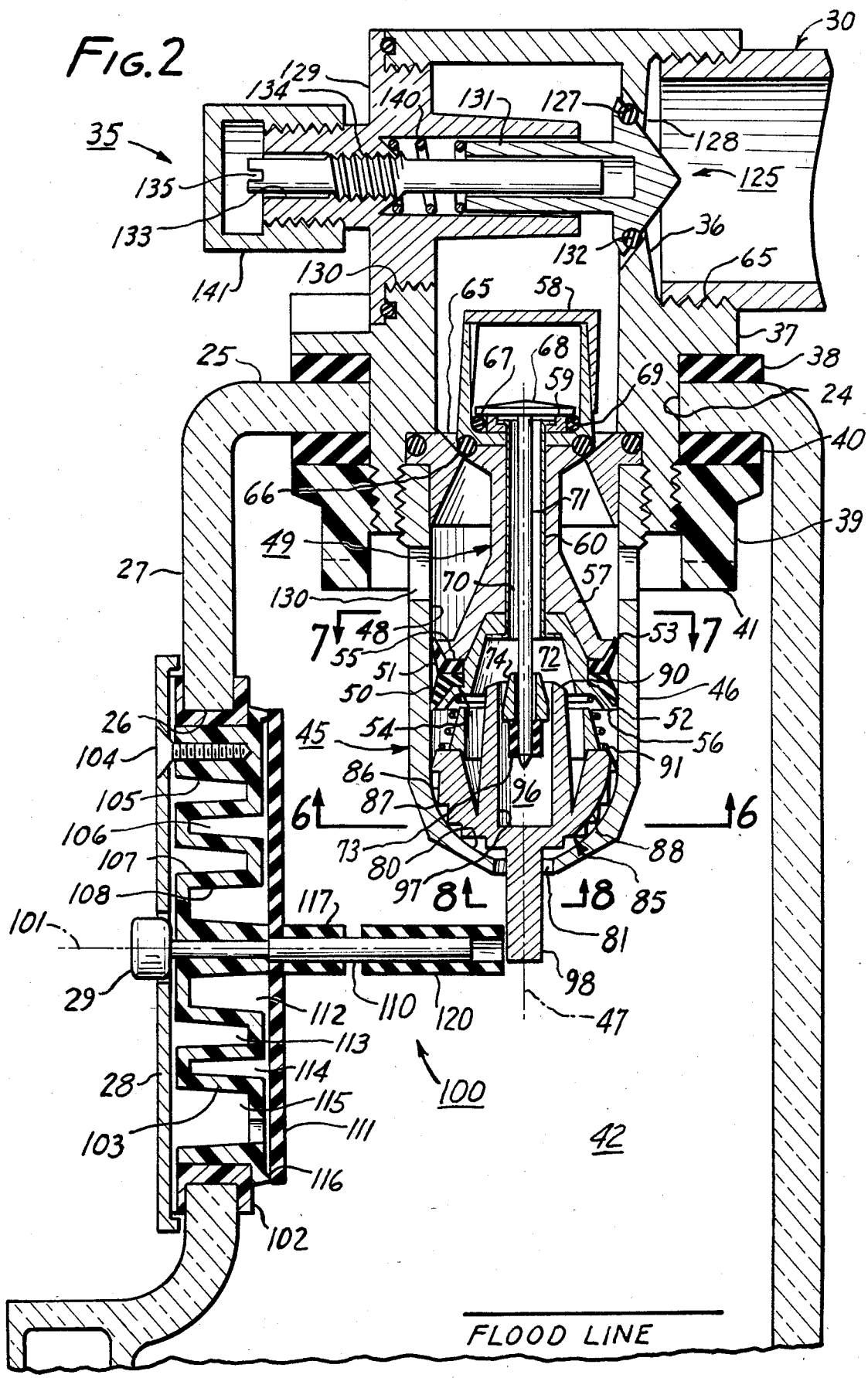

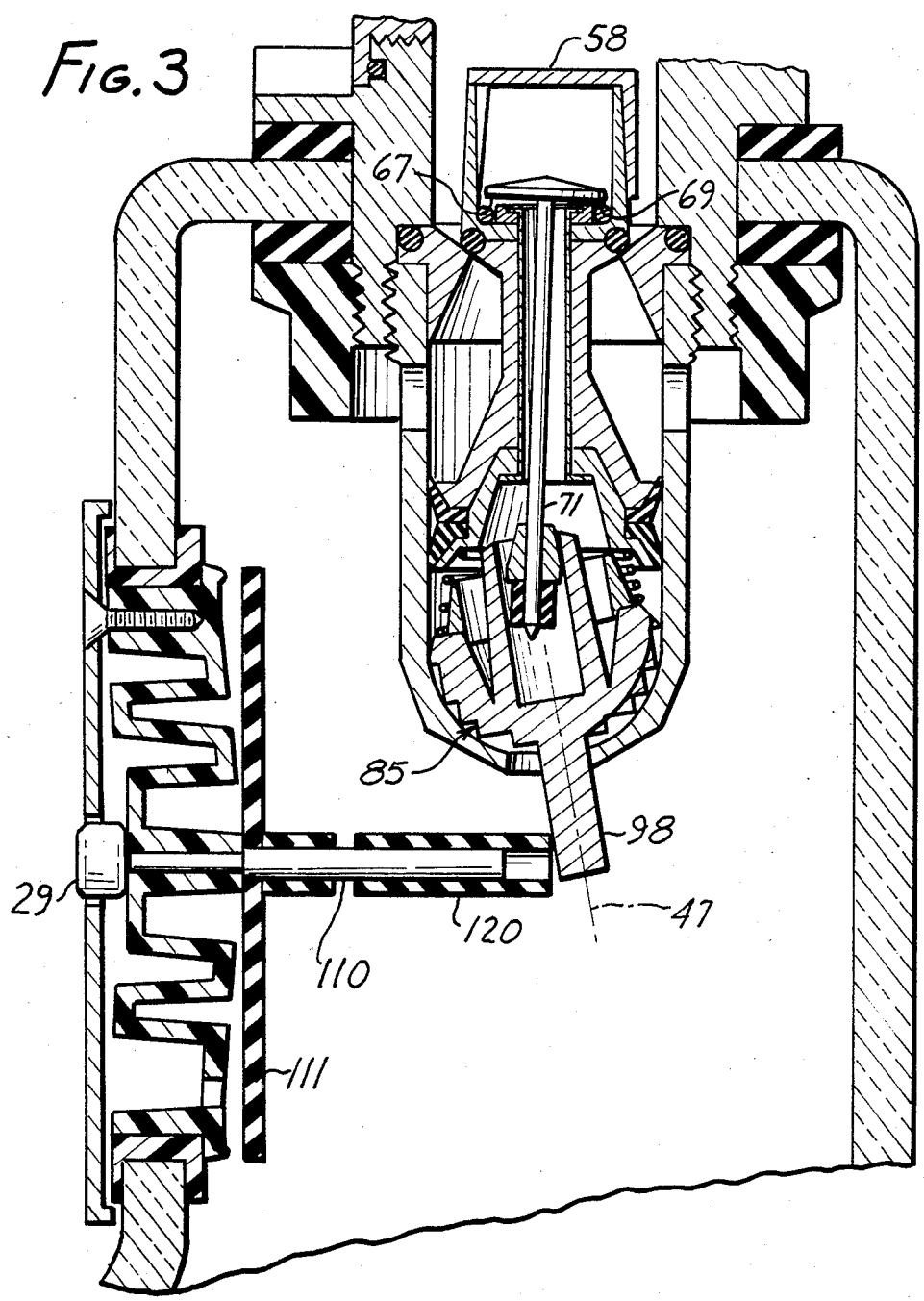

FLUSHOMETER VALVE INTEGRABLE WITH A STRUCTURE

FIELD OF THE INVENTION

This invention relates to a flushometer valve for use with commodes and urinals, especially ceramic commodes and urinals.

BACKGROUND OF THE INVENTION

Flushometer valves, as the term is generally used in the plumbing industry are valves which, upon actuation such as the press of a button or pedal, open to deliver a quantity of water suitable for an intended flush. Generally they utilize some kind of delay mechanism which keeps the valve open for a suitable length of time, taking into account the system pressure and other flow parameters.

Conventional flush valves are usually complete in and of themselves, are mounted externally of the commode or urinal, and are made of metals which are expensive to purchase and process. In addition to this inherent costliness, these valves are exposed to view and to access by vandals. They are frequently damaged by these persons, and their repair or replacement is another unfortunate element of ultimate cost.

Many of the limitations which lead to these costly expedients, and to exposing the valve to mistreatment are the consequence of the next assembly to which they apply - the ceramic commode or urinal. For convenience, only commodes will be specifically discussed hereafter, but the term is intended to encompass all user devices, including urinals, tanks, and the like. Also, while the invention is primarily directed at solving problems inherent in ceramic structures, it is equally useful in structures made of wood, organic plastic, or metal, and therefore no limitation to use only with ceramic structures is intended or implied.

The principal problem in integrating a valve into a ceramic structure is the loose dimensional tolerances of the structure. These devices are made in potteries. The clay is formed in molds, and transferred to kilns where they are fired to harden and glaze them. While the processes for making these devices are very sophisticated and the envelope shapes are visually and dimensionally quite repeatable, still, especially on the inside, there is enough variation that efforts to integrate flush valves into the ceramic structure have not heretofore been successful, especially with a valve which can be made inexpensively. This is also true of structures made of other common materials such as organic plastics and wood. By the term "integrate" is meant the capacity to mount various parts of the valving system inside the commode such that parts of the commode perform some of the functions of the valve itself.

It is an object of this invention to provide a flush valve that can be integrated into a supporting using structure, which can be made of relatively inexpensive materials which are adaptable to operate when integrated in structures with dimensional variations, which will deliver a desired volume upon actuation, which can not be held open to continuous flow, and which generally provides all of the other features desirable in a first class flush valve.

BRIEF DESCRIPTION OF THE INVENTION

The flush valve of this invention is intended for use with a structure such as a commode which has a cavity with two wall openings to receive parts of the valve so they can be mounted to and inside the structure. The flush valve has an inlet adapted to be connected to a source of water under pressure, and an outlet which leads to the using device, such as the bowl of a commode. A poppet valve has a poppet cylinder, a poppet piston in said cylinder, a main poppet seat and main poppet seal, and a piston seal slidably fitted in the poppet cylinder. Main poppet seal or seat is carried by the poppet piston, and the other is mounted in the cylinder. The inlet and outlet are on opposite sides of the main poppet seal.

The poppet piston has a pilot pressure passage extending therethrough, a pilot seal above and in fluid communication with the pilot pressure passage, and a pilot member having a pilot shaft passing through the pilot pressure passage with ample wall clearance. The pilot member also has a tilt plate carrying a pilot seat adapted to rest on and seal with the pilot seal with the pilot shaft being centered in the pilot pressure passage. When closed in this way, there is no supply pressure in the pilot pressure passage. The pilot shaft dangles beneath the pilot piston.

A rocker seat is formed beneath the cylinder and supports a rocker which can be rotated around a center defined by the rocker seat. The rocker has a rocker post which projects through an opening in the rocker seat. The degree of tilt available to the rocker can be limited by engagement of the rocker post with the wall of this opening. The rocker has a socket into which the pilot shaft depends. It has a socket wall adapted to engage a fulcrum collar on the pilot shaft, so that tilting the rocker tilts the pilot shaft, thereby tilting the tilt plate and separating the pilot seal and pilot seat. This passes pilot pressure to the pilot pressure passage, and thence beneath the pilot piston, raising the poppet piston to separate the main poppet seal to allow flow through the valve to the user device.

When the tilt shaft is again centered, the pilot seat and pilot seal again close the pilot pressure passage to flow, and the valve will return to its closed position after water in the cylinder drains out, the rate of drainage is determined in large part by channeling on the rocker, which permits gradual drainage and therefore gradual return to the closed position.

Actuator means is mounted to the other of the openings in the cavity of the commode. This is a relatively large opening so that internal assembly is feasible. A flexure diaphragm is fitted in the opening, and supports a push rod aligned with the rocker post. An endwise force on the push rod tilts the rocker post as described above. The push rod carries a contact sleeve which will slide to its ultimate maximum extent when the rocker post is tilted to its maximum tilt. This is a one-time adaptive adjustment. The diaphragm may be provided with vacuum breaker means.

According to a preferred but optional feature of the invention, the system includes a flow rate adjustment, and a backflow check valve.

According to yet another preferred but optional feature of the invention, the fulcrum collar is slidable, so as to rise above the socket in the rocker member where in the event there is an effort to hold the valve open, the fulcrum collar is out of contact with the socket, and the pilot shaft can still return to center, even with the rocker held in its tilted condition by some continuing pressure on the push button.

The above and other features of this invention will be fully understood from the following detailed description and the accompanying drawings, in which:

BRIEF DESCRIPTION OF THE DRAWINGS

FIG. 2 is an axial cross-section showing the flush valve in its closed condition;

FIG. 3 is a similar view, but with the valve in its flush-initiate condition;

DETAILED DESCRIPTION OF THE INVENTION

Figure 1:
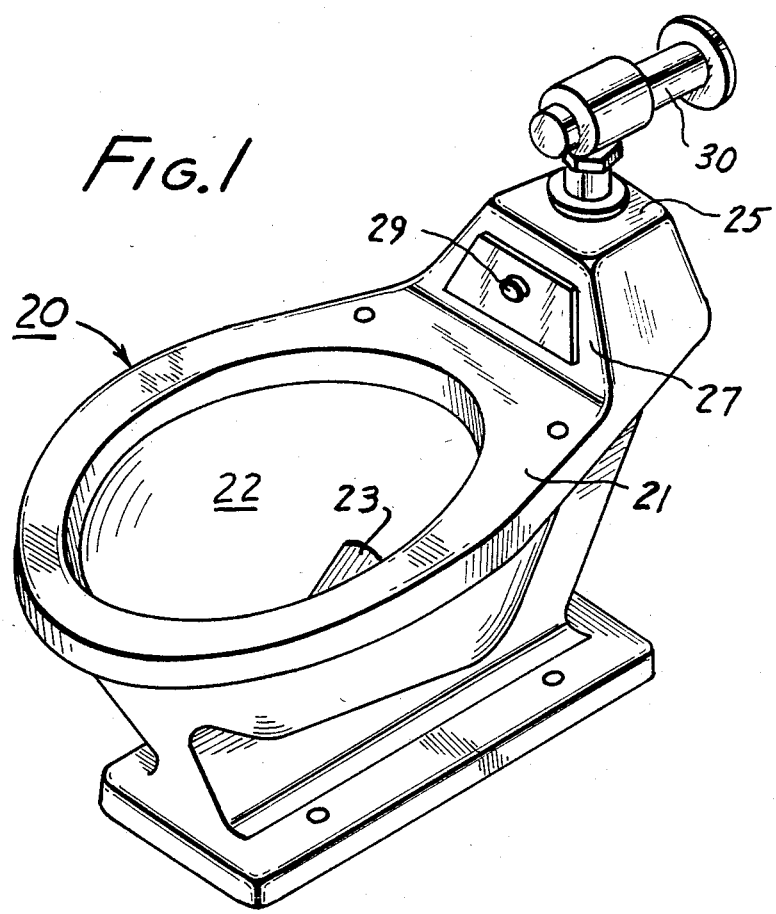
FIG. 1 is a generalized view of a user device, in this case, a ceramic commode.
Figure 8:
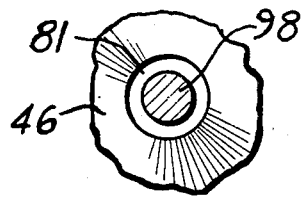
FIGS. 6, 7 and 8 are cross-sections taken at lines 6—6, 7—7, and 8—8, respectively.
Figure 7:
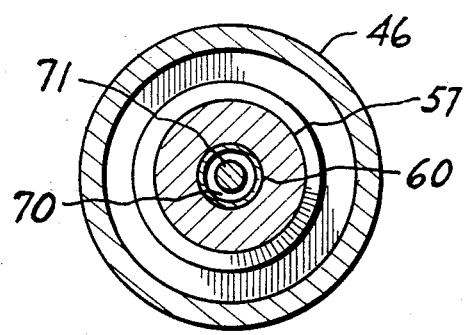
Figure 6:
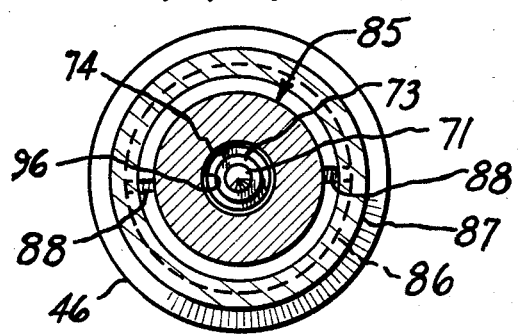

A user device 20 such as a ceramic commode is shown in FIG. 1. It has a rim 21, a bowl 22, a bowl inlet 23, and a bowl outlet (not shown). At the top, there is an upper opening 24 through wall 25, and a forward opening 26 through wall 27. Of course walls 25 and 27 are part of a unitary structure. An escutcheon plate 28 covers opening 26, and a push button 29 passes through it for actuation purposes. Pipe 30 conveys water under pressure to the system as will better be shown hereinafter. It is intended to deliver a predetermined amount of flush water to the bowl each time the push button is depressed.

The shut, or repose, condition of the flush valve system 35 is shown in FIG. 2. A pilot valve mount 36 fits in opening 24. It has a flange 37 which bears against a gasket 38 that in turn bears against wall 25. The lower end of the mount is externally threaded. It receives a nut 39 that bears against a gasket 40. Tightening the nut, which has wrench engaging surfaces 41, sealingly affixes mount 36 to wall 25. It should be observed that cavity 42 in which the valve is placed, is usually closed to access. For this reason, opening 26 is large enough to pass nut 39, so that assembly can be accomplished by reaching through opening 26.

A poppet valve 45, which can be assembled to mount 36 before the mount is affixed to the wall, has a poppet cylinder 46 having a central axis 47 and an interior cylindrical axially-extending wall 48. A poppet piston 49 is slidingly fitted in wall 48.

Poppet piston 49 carries a downwardly facing cup seal 50 and an upwardly facing dirt scraper 51. These elements have peripheral contact surfaces 52, 53, respectively, that slide along the cylinder wall. They have inner flanges 54, 55, respectively, which are trapped between shoulders on a clamp element 56 and on a neck element 57. A cup 58 and a retainer 59 are located at the top of the neck element. Elements 56, 57, cup 58 and retainer 59 are held assembled by a tubular eyelet fastener 60, which is turned outwardly at both ends to make the assembly. This constitutes a very inexpensive sub-assembly, which is expedient to assemble.

Cup 58, is an interdigitated self-cleaning filter, receptive of water under pressure.

A main poppet seat 65 peripherally extends around the wall of the cylinder. It faces a main poppet seal 66, which is carried between the neck element and the cup. This seat and seal constitute the off-on control of the valve.

A pilot seal 67 is trapped between retainer 59 and cup 58. More importantly, it projects upwardly as a ring so as to be engageable by a tilt plate 68 whose lower, outer region constitutes a ring-shaped pilot seat 69. When the tilt plate is horizontal, seat 69 rests on seal 67, so that flow past them is prevented.

A pilot pressure passage 70 extends through the neck element, or more precisely, through the eyelet fastener. It extends from end to end. A pilot shaft 71 is integral with the tilt plate, passes through the pilot pressure passage with substantial wall clearance, and projects into a pilot chamber 72 below the pilot piston. The shaft is preferably circularly cylindrical. It carries a fulcrum stop 73 in the form of a collar which is adjustably slidable thereon, and a fulcrum collar 74 that is loosely slidable thereon, whose lowermost position is determined by the fulcrum stop.

At its lower end, the structure which forms the cylinder is turned in so as to form a rocker seat 80. The surface of this seat is preferably a zone of a sphere, for reasons yet to be explained. An opening 81 is formed at its lower end, on the axis A rocker 85 has an exterior lower surface which has a group of coaxial grooves 86 separated by circular, in-plane, edges 87. These edges make a close sliding contact with seat 80 so as to prevent, or at least greatly to impede, fluid flow across them.

One or more notches 88 are cut across each of these edges. These notches provide a limited fluid flow path. Groove plug partitions can be place in each groove to limit the circumferential flow of water. These are staggered to provide elongated flow paths. It is advantageous to notch alternate edges at 355 degrees from each other, so as to enlongate the flow path. This enables the valve to provide a maximally long flush cycle. If a shorter cycle is desired, then additional sets of notches can be cut in axial alignment with the one above in order to shorten the water flow path length. Combinations of these arrangements can also be provided to produce whatever flow restriction is required.

At its upper end, rocker 85 has a socket 96 with a cylindrical wall 97. A rocker post 98 projects through opening 81. Its greatest tilt is defined by contact with the wall of this opening.

In the repose, valve-closed condition (FIG. 2) both collars 73 and 74 are inside the socket. Collar 73 stays where it is unless forcibly moved to adjust its position. Collar 74 is loose and free sliding, so that it can leave the socket. The socket has an upper end edge 90.

A compression bias spring 91 is disposed in compression between the rocker and the piston. Its bias tends to center the rocker, and to raise the piston. Its effect in raising the piston is overcome by hydraulic forces that tend to close the valve. The lateral cross-section area enclosed by the piston seals is greater than the lateral cross-section area enclosed by the poppet seals, so the valve can be opened. This completes the assembly at opening 24. It will be observed that the entire assembly can be pre-assembled in the factory, and installed at the pottery or at the job site merely by passing nut 39 through opening 26, and reaching through opening 26 to tighten down the nut. The gaskets are also installed at this time.

The actuation portion 100 of the system is installed at hole 26. This hole has a central axis 101, and its axis, and axis 47 should intersect preferably at right angles, or at least be so close that contact of certain parts to be described will be made.

A grommet 102 is fitted onto the boundary of opening 26. A flexure diaphragm 103 closely fits in the grommet, and is held in place by screws 104 passed through the escutcheon plate. This diaphragm is made of an elastomeric material which tends to return to the illustrated shape. Circular grooves 105, 106, 107, 108 are alternately formed on opposite sides of the diaphragm, which is thereby made stiffly flexible.

Push button 29 has a push rod or shaft 110 that passes through the diaphragm and aims at the rocker post. A flexible vacuum breaker-seat 111 is formed as a resilient disc which normally bears against the flexure diaphragm. For vacuum breaking purposes, channels 112, 113, 114 and 115 are formed as shown with escutcheon plate, grommet, and flexure diaphragm, leading from atmosphere to the inner face of the flexure diaphragm. A sealing ridge 116 is formed around the flexure which will make peripheral contact with seal 111 to prevent this flow unless there is a negative pressure in region 42 that must be broken.

Shaft 110 carries a retainer collar 117 that holds seal 111 against the flexure diaphragm. It also carries an actuator collar 120 which is adjustably slidable along shaft 110. It can be moved along shaft 110 but only by exertion of substantial, unusual, force. It projects toward, and will ultimately be brought to bear, against the rocker post.

Observe here that this portion of the system can be mounted from the outside. Because certain of the parts are of nearly the same dimensions, their plan view shape will be made elliptical. Then the parts which must be passed inside (that would be too large if the shapes were circular) can be passed through, with the minor axis of one aligned with the major axis of the other. Then, once inside, the part can be rotated into alignment. When installed, the system is fully operable, and self-adjusting.

Practical systems must also include flow adjusting valves, stop valves, and reverse check valves. Such means can readily be incorporated in this system, although they generally will be outside the commode. Still, they are simple and rugged, and can be protected by strong caps and the like, so that their exposure is not a significant disadvantage.

A valve 125 for these purposes is also shown. It may conveniently be threaded into an exposed portion of mount 36, aligned with pipe 30. The mount may be provided with a seat 127 in inlet 128. Valve 125 has a body 129 threaded into a side opening 130 in the mount. A valve poppet 131 carries a seal 132 adapted to close against seat 127. A sink 133 receives a screw 134, and the nose is slidable on it. Screw 134 is threaded into body 129. When the screw is turned down fully (by a screwdriver engaged in slot 135) it can close the system at seat 127 as a stop valve.

Backed off, the screw determines the maximum opening at this seat, so it is a flow adjustment valve.

Bias spring 140 biases the poppet toward the seat, so it becomes also a negative flow check valve.

Cap 141 threaded onto body 129 protects the adjustment feature from unauthorized tampering.

The assembly of this device should be evident from the foregoing. Its operation will now be described.

Initially, it should be observed that the setting of the location of the fulcrum stop will be made at the factory. It will be set where the fulcrum collar will clear the top edge of the socket in the rocker when the socket post is fully tilted. The position of the actuator collar 120 on the push rod 110 will be self-adjusted during the first cycle after installation.

In the repose condition (FIG. 2), chamber 72 has been drained. The bias spring has returned the rocker to center. The pilot shaft is centered and the pilot seat and seal are engaged. Thus, chamber 72 is at atmospheric pressure (as is region 42). The region above the cup is under pressure. This pressure forces the piston down, and the valve is closed at the main poppet seal.

FIG. 3 shows initiation of the flush cycle. The push button has been pressed. The flexure diaphragm has bent, and actuator collar 120 has pushed rocker post 98 against the edge of opening 81. This is as far as the post can go. If collar 120 had been too far extended, this contact would have pushed it back to the illustrated position. It is now permanently adjusted.

Tilting of the rocker causes the wall of the socket to push fulcrum collar 74 laterally. This will tilt the pilot shaft, and will also tilt the tilt plate, raising an edge of seat 69 off of the seal 67. This will pass fluid under pressure to and through pilot pressure passage 70, into region 72. This creates a differential net force which will raise the piston, and open the valve at the main poppet seal. Water will flow past it and out port 130 into the discharge channel for the user device.

Figure 4:
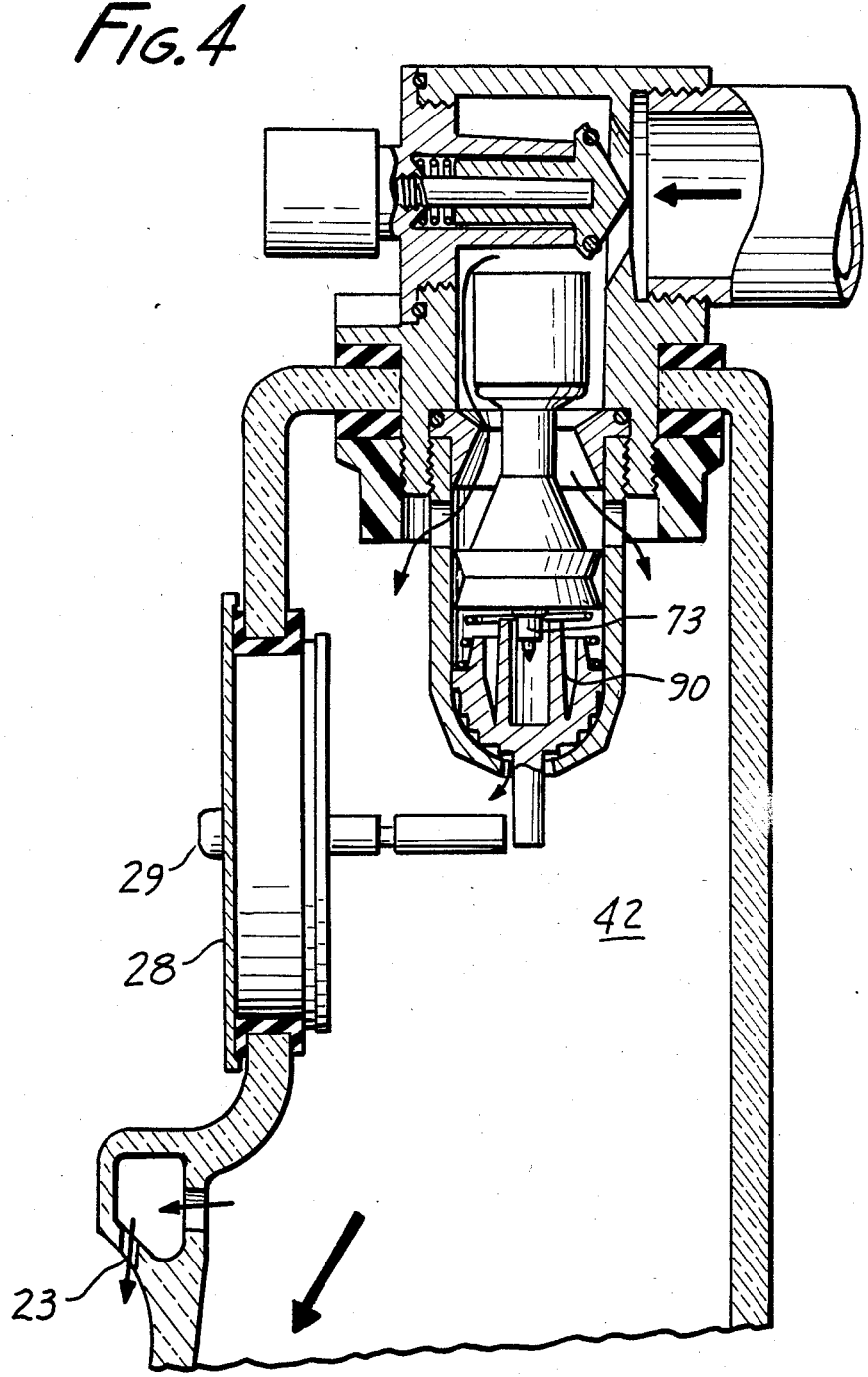
FIG. 4 is a similar view, but with the valve in its full open flow condition.

The push button next will be released, see FIG. 4. Notice that the fulcrum collar has left the rocker socket, and that the vacuum breaker diaphragm has sealed against the flexure diaphragm. Also, the check valve has opened to the maximum extent permitted by the screw. The pilot shaft has again centered, and the pilot seat and seal are engaged. No more water will enter the pilot pressure passage. Now region 72 drains past the outside of the rocker, through the notches and grooves, and out opening 81. As the water leaves, the piston descends, until once again the valve is closed.

Observe that water which flowed into the pilot pressure passage was filtered, and that the dirt scraper collar tends to keep dirt away from region 72. Therefore this critical area is protected from particulates which might impede its function.

Figure 5:
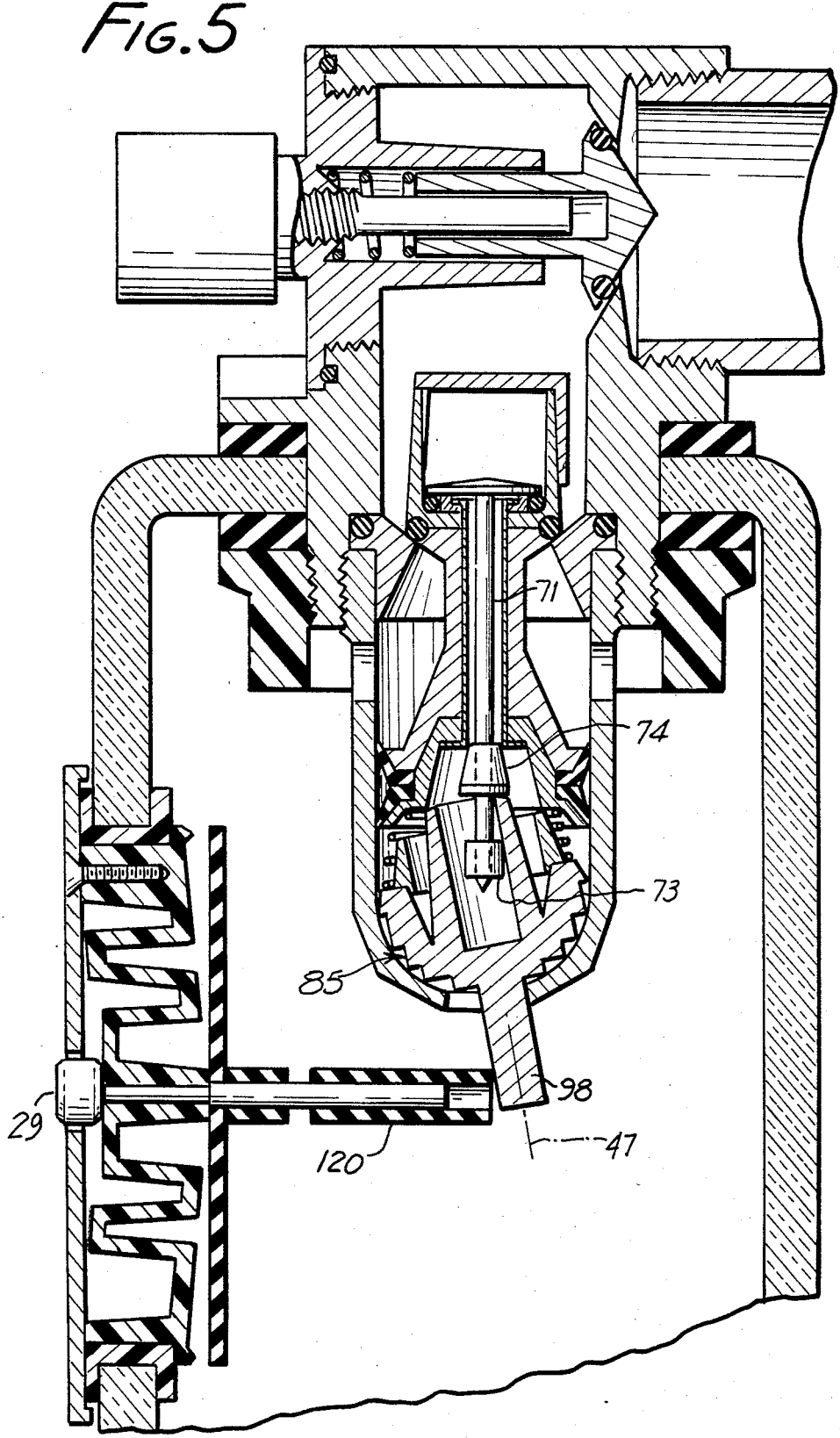
FIG. 5 is a similar view, showing the frustration of an effort to hold the valve open.

Suppose someone holds down the push button continuously to try to make a continuous flush. See FIG. 5. The upper edge of the rocker socket is caught *under* the fulcrum collar, and merely slides it freely up the pilot shaft. Note that the fulcrum stop is far beneath the collar 74. But when the push button is released, the fulcrum collar 74 will again slide down to it. Thus, in this condition, the rocker has no tilting effect on the pilot shaft, because it cannot laterally contact the fulcrum collar.

This invention provides a construction, most of whose parts can be molded from organic plastic materials. Assembly of all critical parts is at the factory, and successful field installation to structures of varying dimensions is assured. The device is proof against most abuse, and is reliable and self-adjusting.

This invention is not to be limited by the embodiments described herein, but only in accordance with the scope of the appended claims.

I claim:

1. A flush valve system adapted to be mounted to and integrated with a structure having a cavity and walls, there being a pair of openings through said walls into said cavity, said system being adapted to deliver a timed flow of liquid, said system having an inlet adapted to be connected to a source of liquid under pressure, and an outlet adapted to deliver the liquid to a user device, comprising:

a poppet valve mounted at one of said openings having a poppet cylinder with an internal cylindrical wall having a central axis;

a poppet piston slidably fitted in said cylinder; a main poppet seat and a main poppet seal, one of which is carried on the outside of said piston, and the other of which is carried by the cylinder; and a piston seal carried by the piston which is slidingly and fluidsealingly engaged to said wall of the cylinder; a pilot pressure passage extending through the piston from end to end; a pilot seal carried by the piston and in fluid communication with said pilot pressure passage; a tilt plate having a pilot seat adapted to rest upon and seal with said pilot seal unless it is tilted; a pilot shaft fixed to and depending from said tilt plate, passing through said pilot pressure passage with a substantial wall clearance, and projecting into a region in the cylinder below the piston; a rocker seat formed below said poppet piston and within said cylinder; a rocker seated on said rocker seat for rocking movement around a center within said cylinder; restricted drain passage means between said rocker and said rocker seat for permitting limited flow of fluid therethrough to time the seating of the poppet valve; a rocker post depending from said rocker below said rocker seat; an upwardly-directed socket carried by said rocker into which said pilot shaft depends, said socket having a bounding wall; and a fulcrum collar on said pilot shaft adapted to be engaged with the wall of said socket for lateral deflection; and actuation means mounted at the other of said openings so comprising a separately-mounted push rod adapted to engage said rocker post to deflect it, rotate the rocker, so the bounding wall of said socket engages said fulcrum collar and laterally tilts the pilot shaft, thereby tilting the tilt plate to open the pilot pressure passage to pressure flow, and thereby to raise the piston to separate the main poppet seal and seat to open the valve to flow, said flow continuing until said pilot shaft is automatically returned to a central position upon the release of said actuation means to permit the tilt plate to cause the pilot seat and seal to engage and liquid thereafter drains from the region under the piston to permit it to return so the main poppet seal and seat again engage and close the valve at a rate determined by the restricted drain passage.

2. A flush valve system according to claim 1 in which filter means is carried by said piston, so disposed and arranged as to filter liquid which enters the pilot pressure passage.

3. A flush valve according to claim 2 in which the filter is self-cleaning.

4. A flush valve system according to claim 1 in which said drain passage means comprises a plurality of separated circumferential grooves on said rocker, interspersed with circumferential edges that make substantial fluid sealing contact with said rocker seat, and restricted flow passage means extending across said edges.

5. A flush valve system according to claim 4 in which said flow passage means, from edge to edge, are angularly displaced from one another.

6. A flush valve system according to claim 4 in which a partition is formed in each groove which requires substantial flow around said groove to reach the next notch leading to the next groove.

7. A flush valve system according to claim 1 in which said fulcrum collar is freely slidably fitted onto said pilot shaft, whereby to remain outside of said socket should an upper portion of the wall of said socket be beneath it and in its downward path.

8. A flush valve system according to claim 7 in which a fulcrum stop is fitted to said pilot shaft beneath said fulcrum collar to limit the downward movement of the fulcrum collar along the pilot shaft.

9. A flush valve system according to claim 1 in which an actuator sleeve is slidably adjustably fitted onto said push rod, and adopted to bear against said rocker post, said sleeve being slidable only by forces exceeding those needed to tilt said rocker post within its intended range of tilting.

10. A flush valve system according to claim 1 in which said push rod is mounted in its respective opening by a peripheral flexure which tends to move said push rod away from said rocker post.

11. A flush valve system according to claim 10 in which said flexure diaphragm is ported to atmosphere and to the outlet of said poppet valve, and in which a flexible disk-like member is mounted to said push rod so as to bear against and close said posting except when negative pressure exists at said outlet, in which event the disk flexes to open said posting.

12. A flush valve system according to claim 1 in which a stop, check, and flow rate control valve is provided upstream of said inlet, said latter-named valve comprising a seat receiving liquid under pressure, a spring-loaded valve nose adapted to seal against said last-named seat, and a screw slidably mounting said valve nose and limiting its open-most position.

* * * * *